Figure 1:
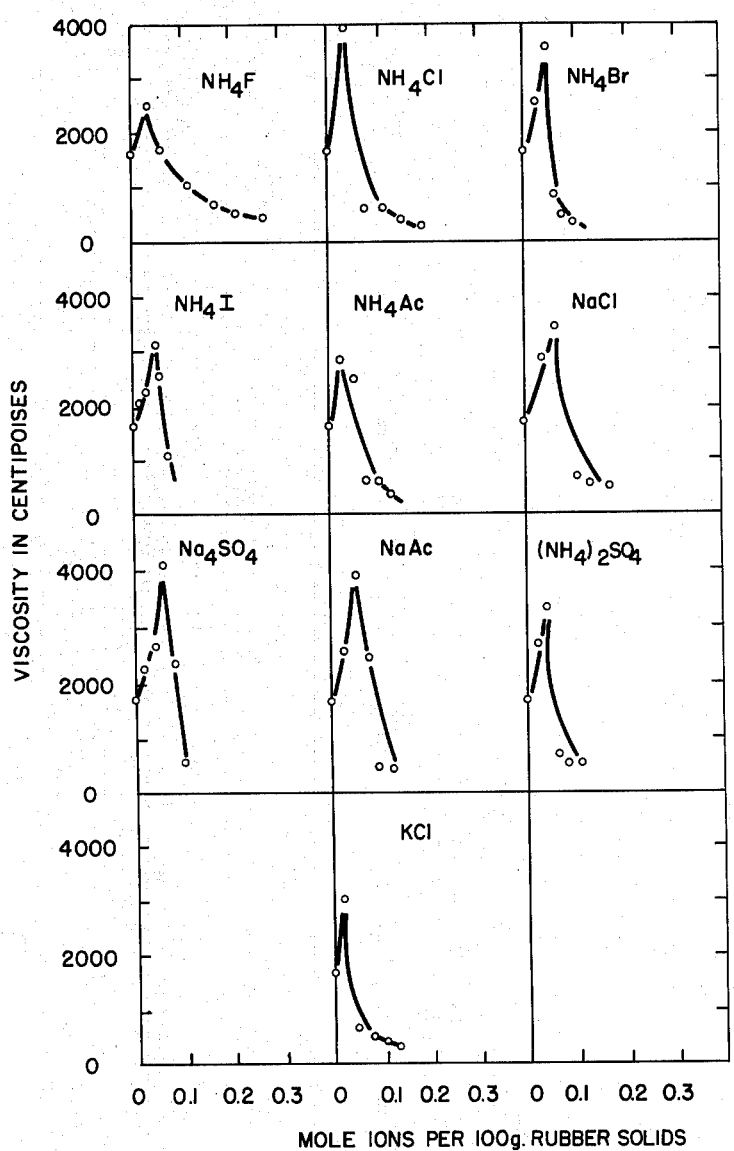

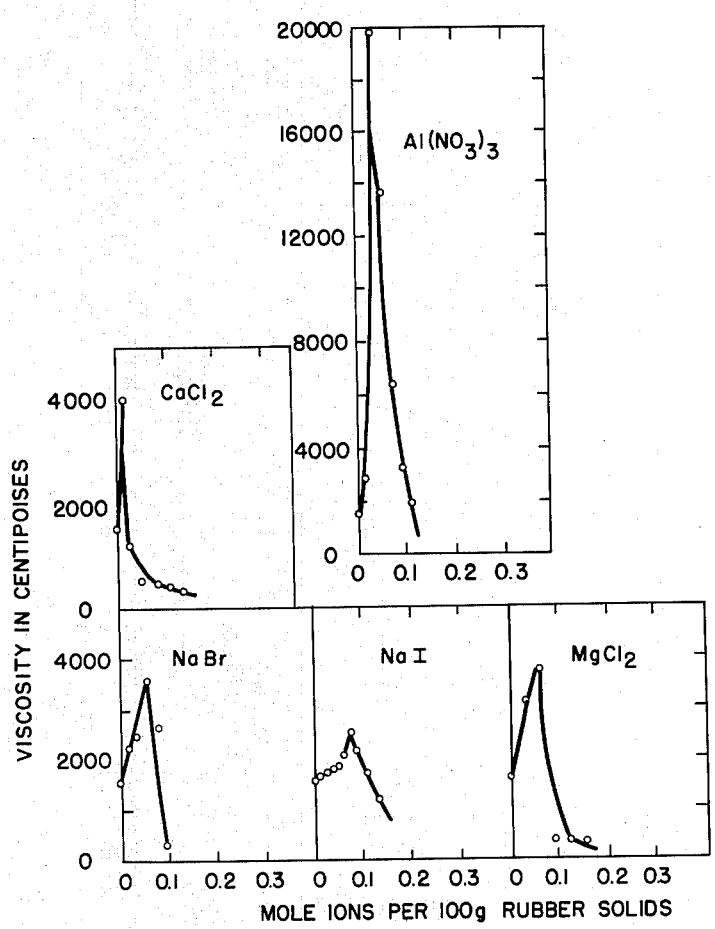

3,222,311
INCREASING VISCOSITY OF BUTYL RUBBER LATICES BY THE ADDITION OF METAL SALTS
Alfred L. Miller, Cranford, and Anthony J. Petro, Roselle Park, N.J., assignors to Esso Research and Engineering Company, a corporation of Delaware
Filed Sept. 10, 1962, Ser. No. 222,581
18 Claims. (Cl. 260—29.7)

This application is a continuation-in-part of Serial No. 784,196, filed December 31, 1958, now abandoned.

This invention relates to the preparation of butyl rubber latices and more particularly relates to a method for controlling the viscosity of such latices.

It is known to produce latices of butyl rubber by many different methods, e.g., by emulsifying with water a solution of butyl rubber in a hydrocarbon or other solvent or by mixing a small amount of water and emulsifier on a mill until a water-in-oil emulsion is formed and gradually ading water until the emulsion inverts and an oil-in-water emulsion is obtained. The resulting emulsion can be stripped to remove all of the solvent and as much of the water as desired. However, for some purposes it is desired to increase the viscosity of the latex without actually increasing the concentration of solids, for example, when the latex is to be used in textile coatings, paper coatings, or in paints.

In accordance with the present invention it has now been found that the viscosity of butyl rubber latices can be increased by the addition of a small amount of an inorganic salt to a latex containing an anionic emulsifier.

Thus, in accordance with the invention, a small amount of the following salts can be added to the latex:

Ammonium fluoride
Ammonium chloride
Ammonium bromide
Ammonium iodide
Ammonium acetate
Ammonium sulfate
Sodium bromide
Sodium chloride
Sodium iodide
Sodium acetate
Sodium sulfate
Potassium chloride
Calcium chloride
Magnesium chloride
Aluminum nitrate Of these salts, KCl, $NH_4Cl$, and $CaCl_2$ are preferred. With each of these salts there is an initial viscosity increase when the first amount of the salt is added. Then as more of the salt is added, the viscosity drops and continues to drop as more of the salt is added.

The following theory is offered as a possible explanation of these effects, but it is to be understood that the invention is not to be limited to this or any other theory. It is believed that butyl latex prepared with an anionic emulsifier contains dissolved emulsifier which is partially micellated. When ionic material is added to the latex, the extent of micellation is increased which in turn is manifested by an increase in total latex viscosity. This increase in micellation reaches a maximum at which time the dissolved emulsifier becomes insoluble. When this happens the viscosity contribution due to micellated emulsifier in solution is lost and accordingly the viscosity of the latex decreases abruptly. These effects are not observed when a nonionic emulsifier is used instead of an anionic emulsifier. Thus, the effects are obtained when using the sodium salt of the sulfated nonyl phenol-ethylene oxide addition product or the sodium salt of sulfated tridecyl alcohol-ethylene oxide addition product, but not with the condensation product of nonyl phenol and ethylene oxide, a nonionic emulsifier.

The addition of the salts also aids in controlling foam during stripping. This results from the fact that dissolved emulsifier contributes to foam production. Therefore, when the dissolved emulsifier is rendered insoluble by the addition of the salts, foaming is suppressed.

Thus, the present invention is directed to the control of the viscosity of butyl rubber latices by the addition of controlled amounts of various inorganic and organic salts. The addition of the first incremental amounts increases the viscosity until it is below the level of the original latex. This is an unexpected phenomenon because these salts will cause coagulation of many other rubber latices including natural rubber latex, emulsion polymerization latex and butyl latices made with other emulsifiers. Even the addition of very large amounts of salts will not result in coagulation.

The amount of salt necessary to be added to produce a viscosity increase above the original viscosity will vary with the type of salt and with the amount of emulsifier present in the latex, but in general the following amounts, in terms of the mole-ions per 100 grams of rubber solids in the latex, have been found suitable:

| | Mole-ions |
|---|---|
| Ammonium fluoride | 0.027–.054 |
| Ammonium chloride | 0.037–0.056 |
| Ammonium bromide | 0.0204–0.0408 |
| Ammonium iodide | 0.0138–0.0552 |
| Ammonium acetate | 0.026–.052 |
| Sodium acetate | 0.0247–0.0741 |
| Ammonium sulfate | 0.0227–0.0454 |
| Sodium sulfate | 0.0211–0.0847 |
| Potassium chloride | 0.0268 |
| Sodium iodide | 0.01335–0.1067 |
| Sodium bromide | 0.0196–0.0784 |
| Sodium chloride | 0.0342–0.0684 |
| Calcium chloride | 0.0135 |
| Magnesium chloride | 0.0315–0.0630 |
| Aluminum nitrate | 0.0188–0.1125 |

The butyl rubber latices used in the practice of this invention are dispersions of vulcanizable elastic copolymers of isoolefins and a small amount of a diolefin. The copolymers useful in the present invention contain a major proportion, preferably at least 70 wt. percent of isoolefins, and a minor proportion, preferably not more than about 30 wt. percent of multiolefins. Copolymers of this general type, especially where the copolymer contains about 85–99.5% (preferably 95–99.5%) of a $C_4$–$C_7$ isoolefin such as isobutylene with about 15–0.5% (preferably about 5–0.5%) of a multiolefin of about 4–14 carbon atoms, are commonly referred to in patents and literature as butyl rubber; see, for example, the textbook "Synthetic Rubber" by G. S. Whitby (1954 edition by John Wiley and Sons, Inc.), pages 608–609, etc. The expression "butyl rubber" as employed in the specification and claims is intended to include copolymers containing about 80–99% by weight of an isoolefin of about 4–7 carbon atoms and about 10–1% of a conjugated multiolefin of about 4–10 carbon atoms. The preparation of butyl-type rubbers is amply described in the literature. In general, it consists of the reaction product of a $C_4$–$C_7$ isoolefin (preferably isobutylene) with a $C_4$–$C_{10}$ (preferably a $C_4$–$C_6$) conjugated diolefin, such as isoprene, butadiene, dimethyl butadiene, piperylene, etc. The reaction product of isobutylene and isoprene is preferred.

The rubber is prepared as a solid crumb and is converted into a latex by dissolving in a hydrocarbon solvent such as hexane. Latices are suitably prepared from this solution by emulsifying with water in the presence of an alkali metal, alkaline earth metal, amine or ammonium salt of a $C_8$–$C_{11}$ organic sulfate and a monovalent salt of dihydrogen ortho-phosphate stabilizer as taught by the Brodkey Patent, No. 2,955,094 or the alkali, amine or ammonium salt of organic ethers of polyoxyethylene sulfate having more than four ethylene oxide groups as taught by the Brodkey Patent, No. 2,936,295. The disclosures of each of these patents are included herein by reference. A typical recipe for the preparation of these latices is as follows:

| | Parts |
|---|---|
| Solution of butyl rubber in hexane (23 wt. % N.V.M.) | 70 |
| Water | 30 |
| Sodium salt of sulfated nonylphenoxypolyethoxy ethanol (per 100 parts rubber solids) | 5 |
| $NaH_2PO_4$ (per 100 parts rubber solids) | 1 |

In preparing these latices it is preferable to employ distilled water since tap water usually contains an amount of salt impurity equivalent to 0.25 phr. ammonium chloride. Such an amount will produce differences in viscosity of the order of 250 cps. However, tap water can be used if this difference is taken into consideration when adding the salt.

The latices thus prepared contain about 10–15% by weight of rubber solids. More concentrated latices (up to 55 to 65% by weight of rubber solids) can be prepared by passing an inert gas through the latex at 150° to 200° F. in order to strip off all of the solvent and enough of the water to give the desired concentration. In accordance with this invention, the viscosity can be increased by the addition of the desired salt as described above.

The invention will be better understood from the subsequent illustrative examples. In these examples, as in all other portions of this specification, when quantities are stated in percentages or in parts, it will be understood that reference is had thereby to parts by weight, unless expressly indicated otherwise.

*Example 1*

A butyl latex was prepared by emulsifying a 23% NVM solution of butyl rubber in hexane with distilled water in the presence of 5, 6 and 7 parts (per hundred parts of rubber) of the sodium salt of sulfated nonylphenoxypolyethoxyethanol and 1 part (per hundred parts of rubber) of sodium dihydrogen phosphate. These latices were stripped of the hexane and concentrated to about 55% by weight total rubber solids content. To successive samples of this latex were added various amounts of ammonium chloride as 25 weight percent aqueous solutions and the viscosities again measured. The data are shown in Table I. The amount of salt added is reported in terms of mole-ions which are calculated as follows: (number moles of salt) × (total number of ions available in the salt).

*Example 2*

A latex was prepared in the same manner as in Example 1 (5 phr) except that tap water was used instead of distilled water. (This latex will hereinafter be known as latex A.) The resulting latex had a viscosity of 1580 cps. (70° F.). To successive samples of this latex were added various amounts of various inorganic salts as 25 wt. percent aqueous solutions and the viscosity was again measured. The data are shown in Table II and plotted in terms of mole-ions in FIGURES 1 and 2 for the inorganic salts.

*Table II*

| Salt | M.W. | M.W./# ions | Phr added | Mole-ions per 100 g. of Latex Solids | Brookfield Viscosity (6 R.P.M.) |
|---|---|---|---|---|---|
| None | | | | | 1,580 |
| $NH_4F$ | 37.04 | 18.52 | 0.5 | 0.027 | 2,440 |
| | | | 1.0 | .054 | 1,640 |
| | | | 2.0 | .108 | 990 |
| | | | 3.0 | .162 | 640 |
| | | | 4.0 | .216 | 500 |
| | | | 5.0 | .270 | 400 |
| $NH_4Cl$ | 53.54 | 26.77 | 1.0 | 0.037 | 3,880 |
| | | | 2.0 | .075 | 540 |
| | | | 3.0 | .112 | 550 |
| | | | 4.0 | .149 | 380 |
| | | | 5.0 | .183 | 290 |
| $NH_4Br$ | 97.96 | 48.98 | 1.0 | 0.0204 | 2,480 |
| | | | 2.0 | .0408 | 3,500 |
| | | | 3.0 | .0612 | 750 |
| | | | 4.0 | .0816 | 440 |
| | | | 5.0 | .102 | 360 |
| $NH_4I$ | 145 | 72.5 | 1.0 | 0.0138 | 2,000 |
| | | | 2.0 | .0276 | 2,200 |
| | | | 3.0 | .0414 | 3,080 |
| | | | 4.0 | .0552 | 2,480 |
| | | | 5.0 | .0690 | 1,000 |
| $NH_4Ac$ | 77.08 | 38.54 | 1.0 | 0.026 | 2,700 |
| | | | 2.0 | .052 | 2,400 |
| | | | 3.0 | .078 | 540 |
| | | | 4.0 | .104 | 510 |
| | | | 5.0 | .130 | 340 |
| NaAc | 81.04 | 40.52 | 1.0 | 0.0247 | 2,440 |
| | | | 2.0 | .0494 | 3,800 |
| | | | 3.0 | .0741 | 2,300 |
| | | | 4.0 | .0988 | 400 |
| | | | 5.0 | .1235 | 400 |
| $(NH_4)_2SO_4$ | 132.15 | 44.05 | 1.0 | 0.0227 | 2,600 |
| | | | 2.0 | .0454 | 3,200 |
| | | | 3.0 | .0682 | 560 |
| | | | 4.0 | .0908 | 420 |
| | | | 5.0 | .1135 | 420 |
| $Na_2SO_4$ | 142 | 47.3 | 1.0 | 0.0211 | 2,120 |
| | | | 2.0 | .0423 | 2,560 |
| | | | 3.0 | .0635 | 4,000 |
| | | | 4.0 | .0847 | 2,200 |
| | | | 5.0 | .106 | 380 |
| KCl | 74.66 | 37.33 | 1.0 | 0.0268 | 2,940 |
| | | | 2.0 | .0537 | 550 |
| | | | 3.0 | .0805 | 390 |
| | | | 4.0 | .107 | 320 |
| | | | 5.0 | .134 | 250 |
| NaI | 149.9 | 74.95 | 1.0 | 0.01335 | 1,670 |
| | | | 2.0 | .0267 | 1,700 |
| | | | 3.0 | .0400 | 1,720 |
| | | | 4.0 | .0534 | 1,700 |
| | | | 5.0 | .0667 | 2,060 |
| | | | 6.0 | .0800 | 2,600 |
| | | | 7.0 | .0934 | 2,300 |
| | | | 8.0 | .1067 | 1,760 |
| | | | 9.0 | .1200 | 1,220 |
| NaBr | 101.9 | 50.95 | 1.0 | 0.0196 | 2,100 |
| | | | 2.0 | .0392 | 2,500 |
| | | | 3.0 | .0588 | 3,600 |
| | | | 4.0 | .0784 | 2,680 |
| | | | 5.0 | .0980 | 420 |

*Table I*

| Phr [1] $NH_4Cl$ [2] added | Mole-ions of $NH_4Cl$ added per 100 g. solids | Viscosity [3] at Indicated Emulsifier Content in cps. | | |
|---|---|---|---|---|
| | | 5 phr | 6 phr | 7 phr |
| 0 | 0 | 1,320 | 1,950 | 3,220 |
| 0.25 | 0.009 | 1,480 | 2,150 | 3,400 |
| 0.50 | 0.019 | 1,770 | 2,440 | 3,900 |
| 0.75 | 0.028 | 2,040 | 2,900 | 4,360 |
| 1.00 | 0.037 | 2,320 | 3,750 | 6,400 |
| 1.25 | 0.047 | 3,450 | 5,175 | 8,020 |
| 1.50 | 0.056 | 3,650 | 4,825 | 7,600 |
| 1.75 | 0.066 | 2,300 | 3,460 | 7,400 |
| 2.00 | 0.075 | | 1,250 | 5,280 |

[1] Parts per hundred parts of copolymer solids.
[2] Added as 25% solution.
[3] Brookfield viscometer, type LVF—6 RPM spindle speed.

Table II—Continued

| Salt | M.W. | M.W./# Ions | Phr added | Mole-ions per 100 g. of Latex Solids | Brookfield Viscosity (6 R.P.M.) |
|---|---|---|---|---|---|
| NaCl | 58.45 | 29.23 | 1.0 | 0.0342 | 2,760 |
| | | | 2.0 | .0684 | 3,300 |
| | | | 3.0 | .1026 | 540 |
| | | | 4.0 | .1368 | 500 |
| | | | 5.0 | .171 | 400 |
| CaCl₂ | 111.0 | 37.0 | 0.5 | 0.0135 | 3,940 |
| | | | 1.0 | .0270 | 1,200 |
| | | | 2.0 | .0540 | 540 |
| | | | 3.0 | .0810 | 540 |
| | | | 4.0 | .108 | 410 |
| | | | 5.0 | .135 | 350 |
| MgCl₂ | 95.23 | 31.75 | 1.0 | 0.0315 | 3,200 |
| | | | 2.0 | .0630 | 3,800 |
| | | | 3.0 | .0945 | 350 |
| | | | 4.0 | .126 | 315 |
| | | | 5.0 | .1575 | 300 |
| Al(NO₃)₃ | 213 | 53.3 | 1.0 | 0.0188 | 3,000 |
| | | | 2.0 | .0376 | 19,600 |
| | | | 3.0 | .0563 | 15,600 |
| | | | 4.0 | .0751 | 6,400 |
| | | | 5.0 | .0938 | 3,400 |
| | | | 6.0 | .1125 | 2,100 |

From these data it is clear that the following amounts of the various salts in terms of their mole-ions per 100 grams of latex solids in the latex must be used for this sample in order to increase the viscosity above that of the original:

|  | Mole-ions |
|---|---|
| Ammonium fluoride | 0.027–.054 |
| Ammonium chloride | 0.037–0.056 |
| Ammonium bromide | 0.0204–0.0408 |
| Ammonium iodide | 0.0138–0.0552 |
| Ammonium acetate | 0.026 |
| Sodium acetate | 0.0247–0.0494 |
| Ammonium sulfate | 0.0227–0.0454 |
| Sodium sulfate | 0.0211–0.0847 |
| Potassium chloride | 0.0268 |
| Sodium iodide | 0.01335–0.1067 |
| Sodium chloride | 0.0342–0.0784 |
| Sodium bromide | 0.0196–0.0588 |
| Calcium chloride | 0.0135 |
| Magnesium chloride | 0.0315–0.0630 |
| Aluminum nitrate | 0.0188–0.1125 |

The present invention thus clearly affords a means for increasing the viscosity of a butyl rubber latex of a given solids content. Such high viscosity latices thus obtained are suitable for coatings and the like, e.g., as water-base or latex paints and as textile and paper coatings, etc.

*Example 3*

Large amounts of various salts, were added to the latex of Example 2 to determine the effect of such large additions on the stability of the latex. The following data were obtained:

*Table III*

SALT TOLERANCE OF BUTYL RUBBER LATEX

| Solution Added To Latex | Ml. Added Per 100 Grams Latex Solids | Observations |
|---|---|---|
| 10% Sodium Chloride | 500 | Stable, no coagulum. |
| 5% Potassium Alum | 500 | Do. |
| 10% Calcium Chloride | 500 | Do. |
| 10% Magnesium Chloride | 500 | Do. |
| 10% Zinc Chloride | 500 | Do. |

The above data emphasizes the stability of butyl rubber latex. This stability is in contrast to SBR and other emulsion polymer latices. As is well known, the addition of much smaller amounts of these compounds to SBR latex causes complete coagulation.

The nature of the present invention having been thus fully set forth and specific examples of the same given, what is claimed as new and useful and desired to be secured by Letters Patent is:

1. A method for increasing the viscosity of latices of a vulcanizable elastic copolymer of 80–99% by weight of an isoolefin of 4 to 7 carbon atoms and 1–10% by weight of a conjugated multiolefin of 4 to 10 carbon atoms, said latex being prepared by the aid of an anionic emulsifier chosen from the group consisting of an alkali metal, an alkaline earth metal, amine and ammonium salts of a $C_8$ to $C_{11}$ organic sulfate, which comprises adding to said latex an inorganic salt selected from the group consisting of ammonium fluoride, ammonium chloride, ammonium bromide, ammonium iodide, ammonium acetate, sodium acetate, ammonium sulfate, sodium sulfate, potassium chloride, sodium iodide, sodium bromide, sodium chloride, calcium chloride, magnesium chloride, and aluminum nitrate, said salts being added in the following amounts per 100 grams of copolymer solids:

|  | Mole-ions |
|---|---|
| ammonium fluoride | 0.027–.054 |
| ammonium chloride | 0.037–0.056 |
| ammonium bromide | 0.0204–0.055 |
| ammonium iodide | 0.0138–0.0414 |
| ammonium acetate | 0.026–.052 |
| sodium acetate | 0.0247–0.0741 |
| ammonium sulfate | 0.0227–0.0454 |
| sodium sulfate | 0.0211–0.0847 |
| potassium chloride | 0.0268 |
| sodium iodide | 0.01335–0.1067 |
| sodium bromide | 0.0196–0.0784 |
| sodium chloride | 0.0342–0.0684 |
| calcium chloride | 0.0135 |
| magnesium chloride | 0.0315–0.0630 |
| aluminum nitrate | 0.0188–0.1125. |

2. Process according to claim 1 in which the added salt is an ammonium salt.

3. Process according to claim 1 in which the added salt is sodium sulfate.

4. Process according to claim 1 in which the added salt is sodium chloride.

5. Process according to claim 1 in which the added salt is sodium bromide.

6. Process according to claim 1 in which the added salt is sodium iodide.

7. Process according to claim 1 in which the added salt is potassium chloride.

8. Process according to claim 1 in which the added salt is calcium chloride.

9. Process according to claim 1 in which the added salt is magnesium chloride.

10. A composition of matter comprising a latex of a vulcanizable elastic copolymer of 90–99% by weight of an isoolefin of 4 to 7 carbon atoms and 1–10% by weight of a conjugated multiolefin of 4 to 10 carbon atoms, said latex being prepared by the aid of an anionic emulsifier chosen from the group consisting of an alkali metal, an alkaline earth metal, amine and ammonium salts of a $C_8$ to $C_{11}$ organic sulfate, said latex also containing an inorganic salt chosen from the group consisting of ammonium fluoride, ammonium chloride, ammonium bromide, ammonium iodide, ammonium acetate, sodium acetate, ammonium sulfate, sodium sulfate, potassium chloride, sodium iodide, sodium bromide, sodium chloride, calcium chloride, magnesium chloride, and aluminum nitrate, said salts being added in the following amounts per 100 grams of copolymer solids:

| | Mole-ions |
|---|---|
| ammonium fluoride | 0.027–.054 |
| ammonium chloride | 0.037–0.056 |
| ammonium bromide | 0.0204–0.055 |
| ammonium iodide | 0.0138–0.0414 |
| ammonium acetate | 0.026–.052 |
| sodium acetate | 0.0247–0.0741 |
| ammonium sulfate | 0.0227–0.0454 |
| sodium sulfate | 0.0211–0.0847 |
| potassium chloride | 0.0268 |
| sodium iodide | 0.01335–0.1067 |
| sodium bromide | 0.0196–0.0784 |
| sodium chloride | 0.0342–0.0684 |
| calcium chloride | 0.0135 |
| magnesium chloride | 0.0315–0.0630 |
| aluminum nitrate | 0.0188–0.1125 |

11. Composition of matter according to claim 10 in which the salt is an ammonium salt.

12. Composition of matter according to claim 10 in which the salt is sodium sulfate.

13. Composition of matter according to claim 10 in which the salt is sodium chloride.

14. Composition of matter according to claim 10 in which the salt is sodium bromide.

15. Composition of matter according to claim 10 in which the salt is sodium iodide.

16. Composition of matter according to claim 10 in which the salt is potassium chloride.

17. Composition of matter according to claim 10 in which the salt is calcium chloride.

18. Composition of matter according to claim 10 in which the salt is magnesium chloride.

References Cited by the Examiner
UNITED STATES PATENTS
2,936,295  5/1960  Brodkey et al. _____ 260—29.7

MURRAY TILLMAN, *Primary Examiner.*
DONALD E. CZAJA, *Examiner.*